US006224124B1

(12) United States Patent
Vollrath, Jr. et al.

(10) Patent No.: US 6,224,124 B1
(45) Date of Patent: May 1, 2001

(54) PARTS TRANSFER AND CONTROL CIRCUIT SYSTEM

(75) Inventors: Victor V. Vollrath, Jr., Indianapolis; William E. Bolton, Beech Grove, both of IN (US)

(73) Assignee: Amsted Industries Incorporated, Chicago, IL (US)

( * ) Notice: Subject to any disclaimer, the term of this patent is extended or adjusted under 35 U.S.C. 154(b) by 0 days.

(21) Appl. No.: 09/165,901

(22) Filed: Oct. 2, 1998

(51) Int. Cl.⁷ ...................................................... B66C 1/42
(52) U.S. Cl. ...................................... 294/119.1; 414/798.9
(58) Field of Search ....................... 294/119.1; 414/798.9; 198/418.7, 418.8

(56) References Cited

U.S. PATENT DOCUMENTS

| | | | |
|---|---|---|---|
| 3,228,538 | * | 1/1966 | Coates ................................ 414/798.9 |
| 4,345,866 | * | 8/1982 | Greene ................................ 294/119.1 |
| 4,699,414 | * | 10/1987 | Jones ................................ 294/119.1 |
| 4,822,091 | * | 4/1989 | Vermeer et al. ................... 294/119.1 |
| 4,852,928 | * | 8/1989 | Monforte ........................... 294/119.1 |
| 5,441,382 | * | 8/1995 | Mojden et al. .................... 414/798.9 |
| 5,586,638 | * | 12/1996 | Mojden et al. .................... 198/419.1 |

OTHER PUBLICATIONS

ABB Flexible Automation, 2487 South Commerce Drive, New Berlin, WI 53151; Maestro System 4® Product Line, Dated May 1996, p. 3, Model No. IRB 2400/10.

* cited by examiner

Primary Examiner—Thomas J. Brahan
(74) Attorney, Agent, or Firm—Edward J. Brosius; Stephen J. Manich

(57) ABSTRACT

An assembly for transfer of roller chain link-plates between operations of a high-rate manufacturing process includes rapid, repeatable and reliable transfer apparatus; tooling for grasping the link-plates without disturbing the advancing link-plates from the completed operation, which grasping-tooling is operable with the transfer apparatus; parts-feeding assemblies for receipt of transferred link-plates; and, a control system with a central processing unit (CPU) and a plurality of sensors, which sensors are coupled between the transfer apparatus, the grasping-tooling, the feeder assembly, the manufacturing equipment and the CPU for communication of control signals to the CPU as well as synchronous control of the several manufacturing operations and the transfer assembly.

7 Claims, 5 Drawing Sheets

PARTS TRANSFER AND CONTROL CIRCUIT SYSTEM

BACKGROUND OF THE INVENTION

The present invention provides an apparatus and control circuit for transfer of parts between a first manufacturing operation and a second manufacturing operation.

More specifically, the present invention provides a gripper jaw assembly to grasp and separate a plurality of chain link plates from a first pressing or stamping operation for their transfer to a second manufacturing operation. The link plates may be in a continuously advancing line of link plates being discharged from a press operation. The gripper jaw assembly is mounted on the distal end of a robotic apparatus with a flexible arm, which gripper jaw is pivotable at the flexible arm end. The proximal end of the flexible arm apparatus is secured to and pivotable about a base, which may be secured to a floor or otherwise permanently mounted. The several assemblies or operations, that is the gripper jaw assembly, the flexible arm, the first press and the second press, are mechanical elements having a plurality of strategically positioned sensors, which sensors are coupled to a central processing unit (CPU) or computer, either directly or through controllers, for control of the operations, sensors and apparatus. The computer is operable to receive signals from any of the sensors and controllers and to communicate control signals to the controllers and operating elements in response to the sensed signals.

Robotic apparatus for manufacturing processes are utilized in various industries and technologies. The specific uses for such robotic apparatus include computer-controlled automatic welding machines in the automotive industry, as well as multi-spindle drilling apparatus for machining industries. Other known uses include assembly and grinding operations. However, all of these applications of such flexible arm or robotic apparatus require operating heads for the specific automated task. The flexible arm of the robotic apparatus provides a large range of motion and a plurality of potential distal end locations in a three-dimensional array of positions. Use of the flexible arm removes an operator from potentially harmful locations in proximity to moving, spinning, pressing, punching or welding operations, and it provides a means to reduce the labor-hours per operation as an economic benefit. Illustrations of such flexible arm apparatus are various models from ABB Flexible Automation Inc. of New Berlin, Wis. noted as IRB 2400. These assemblies and apparatus are described in a brochure, Maestro System 4 Product Line, of May 1996.

The manufacture of roller-chain link plates and chains of all types can involve a large number of mechanical operations. As an example, roller chain manufacture utilizes multiple high-speed presses, which may include sequential punch press operations, to generate the link plates. Other operations may include drill presses, riveting equipment, welding, cold-heading and turning equipment. Each of these mechanical activities can be a high-speed operation, which can present a potential hazard to an operator. Consequently, there have been continuous attempts to automate various steps or operations in manufacturing practices to minimize the danger to employees, as well as to speed the processing activity. As noted above, automating the repetitive steps of the manufacturing process takes an operator out of a potentially hazardous location, for example, it moves an operator away from a punch press operation. Other potentially dangerous operations include drill presses and welding operations. In addition to the health and safety benefits from the automation of manufacturing operations, economic benefits accrue from the use of machinery to perform repetitive tasks previously performed by manual labor.

Acquisition and automatic transfer of relatively small parts between manufacturing operations requires technique, unique tooling, machine and transfer equipment speed, and tooling dexterity. These are requisite attributes as small parts manufacture is frequently a high-volume or high-speed operation. The tooling must be reliable and agile to handle the parts, and operational techniques may require accommodating parts acquisition by tooling in a physically demanding or constrained environment. In the case of link plates for roller chain, each plate may be less than one inch in length with a wall thickness less than one-quarter inch. The link plates will be formed with an hour-glass shape, which physical characteristics are not conducive to being grasped by a large mechanical apparatus. Therefore, the operational techniques and, the ancillary handling and transfer equipment or tooling become necessary elements in the automation-of-manufacturing equation.

SUMMARY OF THE INVENTION

The present invention provides an automated parts handling assembly with tooling to receive parts from a first operation, parts grasping tooling, apparatus to transfer parts between operations, tooling to receive transferred parts for feeding to a second operation, as well as, the control circuits with signal sensors and analytic controllers for controlling the several operations and techniques for continuous manufacturing operations. The parts transfer apparatus includes a robotic device with a spatially programmable flexible arm for movement within a three dimensional array of locations. A gripper jaw assembly, which is independently pivotable at the distal end of the flexible arm, is positionable over aligned, on-edge link plates and actuable to grasp a plurality of link plates for transfer to another location.

In a specific application, roller-chain, link-plate blanks are formed on a continuously operating punch press and fed onto a discharge tray with parts guide rods operable to conform to the contour of the on-edge link plates, which maintains them in a tightly aligned row on the discharge tray. The gripper jaw assembly is positioned to grasp the link plates. Parts wipers at the rear of the gripper jaws to separate the tightly packed link plates being grasped by the gripper jaws from the continuously fed line of link plates on the discharge tray. The grasped link plates are maintained in alignment in the gripper jaws and communicated to a tube feeder for a secondary operation. The tube feeder accepts and maintains the link plates in an aligned manner, and accommodates the gripper jaw assembly for placement of the link plates in the tube feeder.

Control of the grasping, transfer and feeding of the link-plates, as well as the synchronization of these several movements with the manufacturing equipment and operations, is accommodated by an integral network of strategically positioned sensors, equipment controllers and a computer controller, CPU, coupled to the several sensors and controllers to receive input signals and to provide output control signals.

BRIEF DESCRIPTION OF THE DRAWING

In the several figures of the drawing, like reference numerals identify like components, and in those figures.

DETAILED DESCRIPTION OF THE PREFERRED EMBODIMENT

Figure 1:
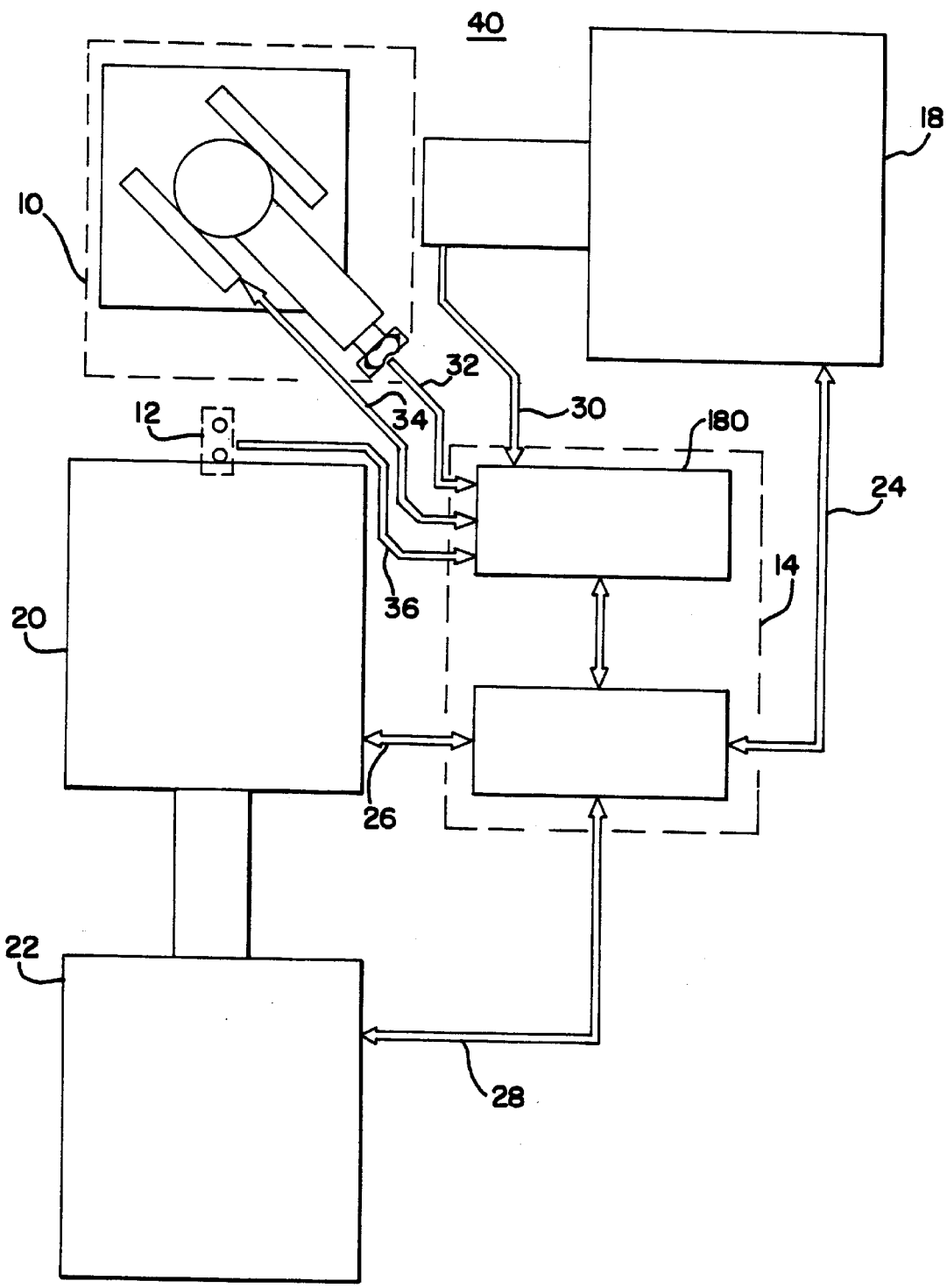
FIG. 1 is an illustrative schematic drawing of the exemplary operations with the input-output signals to the CPU.
Figure 2:
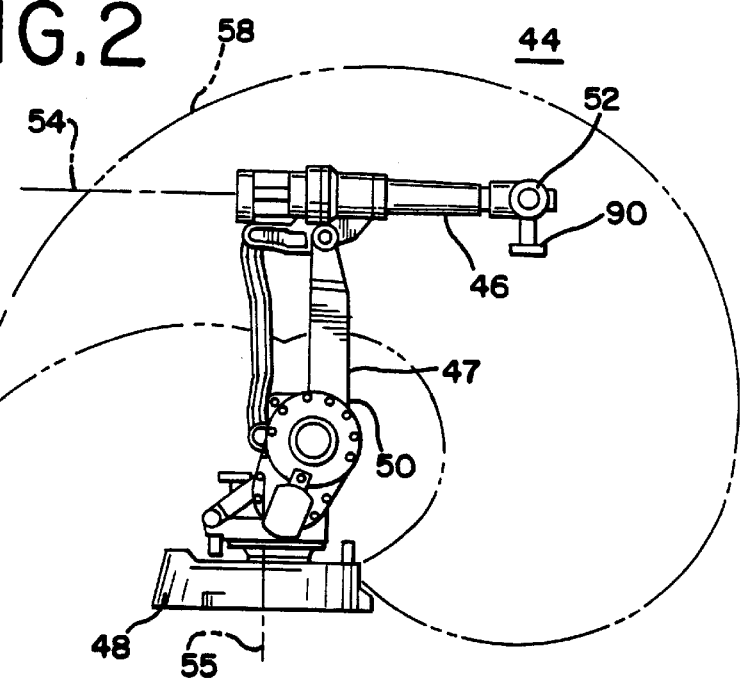
FIG. 2 is an elevational view of an exemplary robotic flexible arm apparatus with an outlined vertical and horizontal range of travel.
Figure 3:
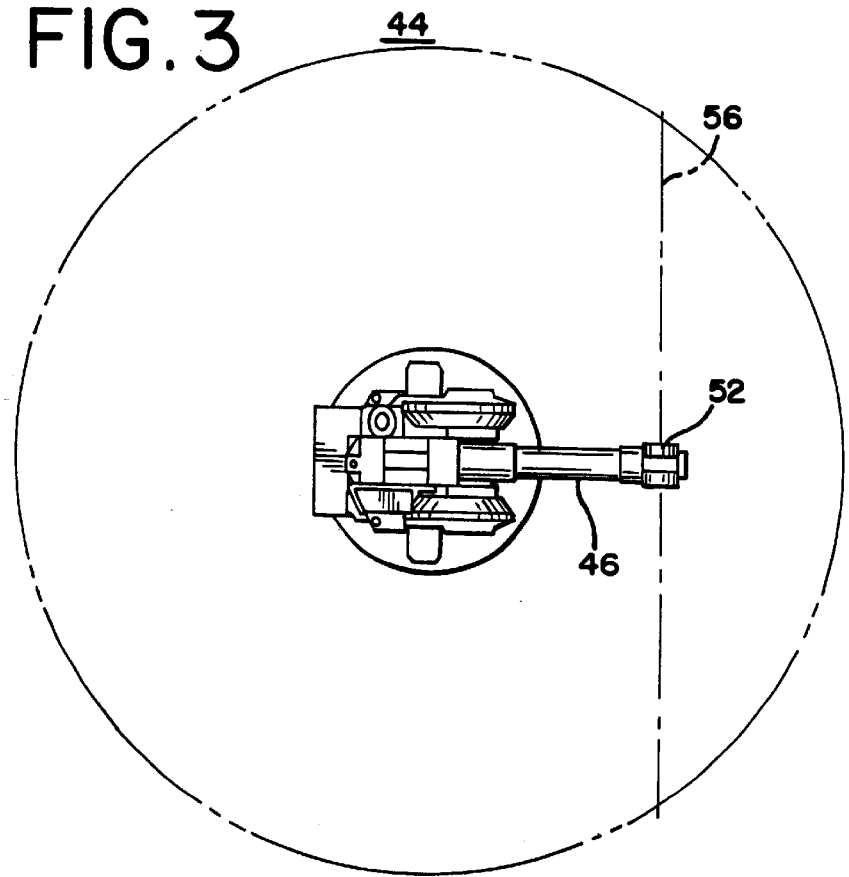
FIG. 3 is a plan view of the apparatus in FIG. 2 showing the outlined horizontal length and width range of travel.
Figure 3A:
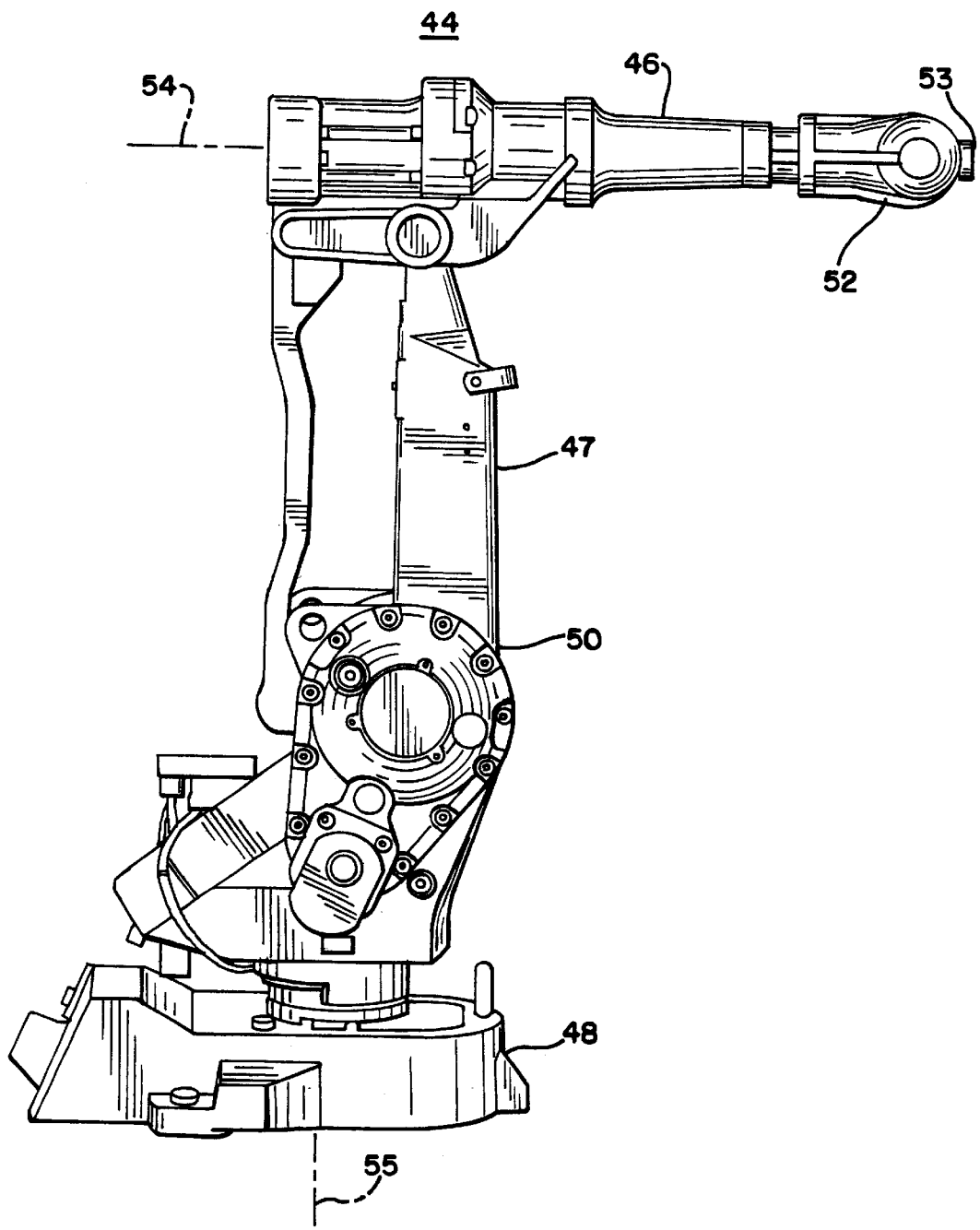
FIG. 3A is an enlarged elevational view of the robotic apparatus of FIGS. 2 and 3.

An assembly 40 for the transfer of small parts is broadly and schematically noted in FIG. 1. Assembly 40 includes parts handling and transfer mechanism 10, parts receiving tooling 12 and control network system 14 for the transfer of parts between machining or manufacturing operations. In this schematic illustration, blanking press 18, bevel press 20 and piercing press 22 are coupled to control network system 14 by lines 24, 26 and 28, respectively, to receive and transmit control signals between presses 18, 20 and 22, and system 14. Lines 30, 32, 34 and 36 connect parts and positional sensors, and transfer mechanism 10 to network system 14 for communication of sensed signals between the several sensors and network system 14. FIGS. 2 to 7 particularly illustrate an apparatus and arrangement, tooling and control means for the mechanical transfer of roller-chain link-plates 16. FIGS. 6A and 6B show link-plates 16 with an hour-glass shape having pinched waist 144, outer edge 17, first lobe 146, second lobe 148, first face 147 and second face 149. The mechanical and automatic transfer of link plates 16 is accomplished by gripper assembly 42 noted in FIGS. 4, 5 and 7, and robotic flexible arm apparatus 44 noted in FIGS. 2, 3 and 3A.

Illustrative of a robotic flexible arm apparatus 44 is the mechanism available from ABB Flexible Automation Incorporated and noted as their model no. IRB 2400/10. Apparatus 44 has extendible arm 46 and vertical segment 47, which is pivotably mounted on base 48 at its proximal end 50. Extendible arm 46 is pivotably connected at its proximal end 45 to distal end 49 of vertical segment 47. The range of motion of arm 46 is noted in FIGS. 2 and 3, which figures combine to illustrate a three-dimensional array of sites for movement of arm 46. Distal end 52 of flexible arm 46 is simultaneously rotatable about first axis 54 and second axis 56. Flexible arm 46 is not limited to linear or planar motions, which broad breadth of motion provides a wide array of available positions.

Figure 4:
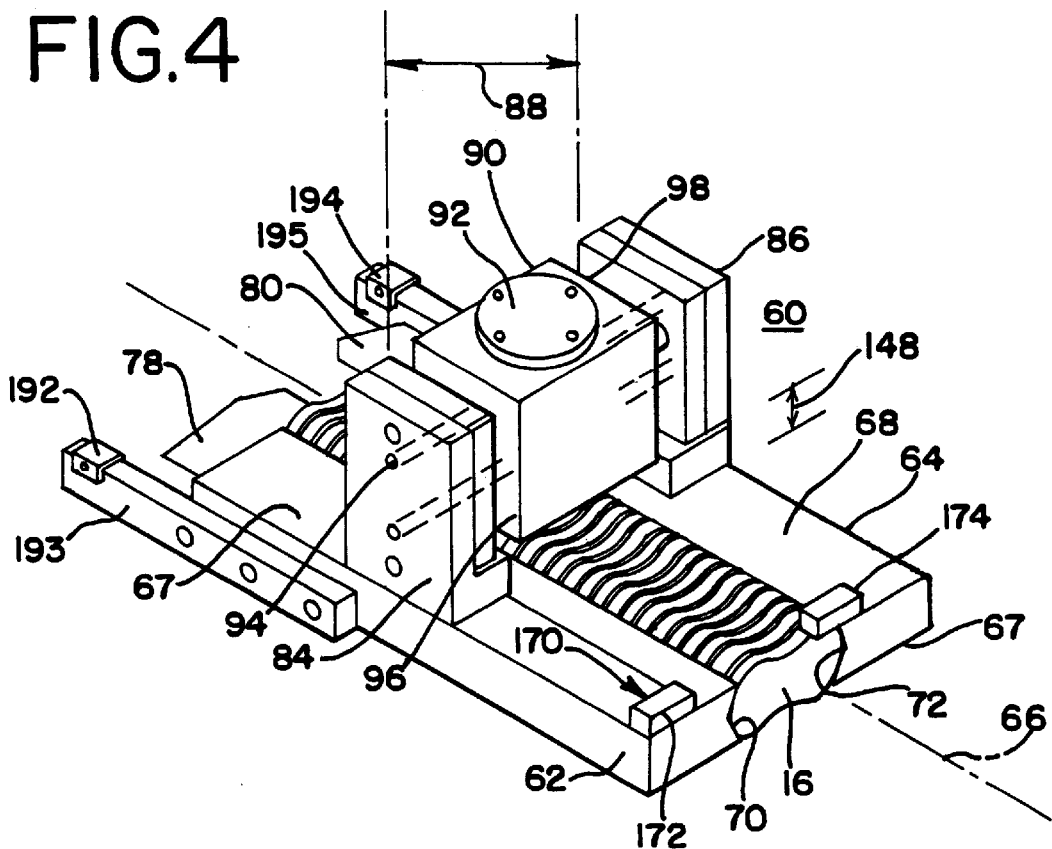
FIG. 4 is an oblique view of a gripper jaw assembly.
Figure 7:
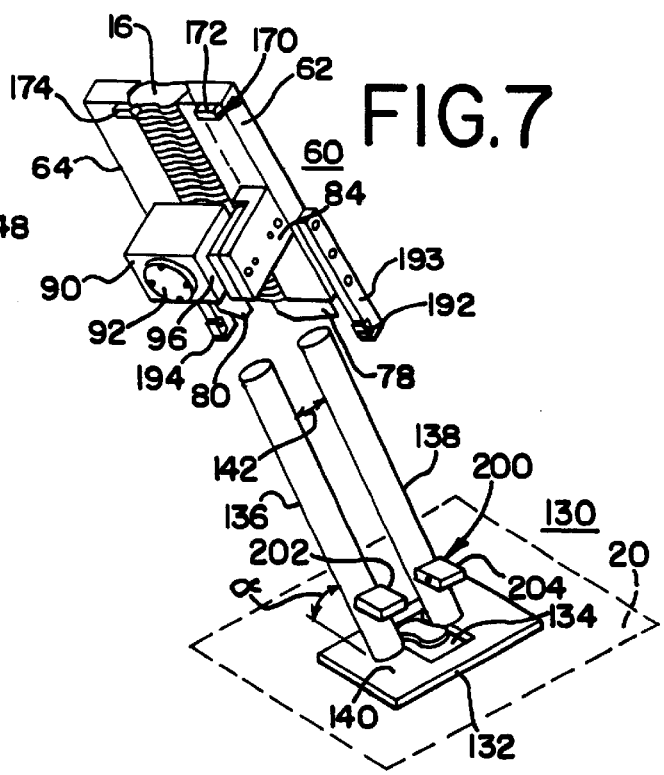
FIG. 7 is an oblique view of a parts feeder apparatus for the secondary operation.

Robotic slide mechanism 90 in FIGS. 4 and 7 is secured to flexible-arm distal end 52 and mounting block 53 by mounting plate 92 and securing means known in the art, such as bolts or weldments (not shown). Reciprocating bars 94 of robotic slide 90 extend from sidewalls 96 and 98 in opposed directions, which bars 94 are pneumatically operable and couplable to tooling devices. Thus, a tool assembly, such as gripper jaw assembly 60 in FIG. 4, may be secured to slide 90 for pivoting and positioning about first axis 54 of flexible arm 46 and second axis 56 of flexible-arm, distal end 52 within the range of motion of flexible arm 46. Although bars 94 are noted as pneumatically operable, it is noted that this is an example and not a limitation, as bars 94 may also be hydraulically or electrically operable.

Robotic control device 180, which is programmable by means known in the art, is coupled to exemplary robotic arm apparatus 44 from ABB Flexible Automation Incorporated. Control device 180 is programmable to control the motions of flexible arm 46 between locations or sites within the above-noted three-dimensional array of sites illustrated in FIGS. 2 and 3. Slide mechanism 90 is activated or deactivated, that is engaged or disengaged, by control device 180 to move reciprocating bars 94 between an extended or withdrawn position. Flexible arm apparatus 46 in FIG. 1 includes control device 180 within or integral to CPU 14, which is connected to CPU 14 and control device 180 by line 34 to control the motions of flexible arm 46. The travel pattern or path of flexible arm 46 may be controlled to travel any path within the volume defined by the rotation of irregular shape 58 shown in FIG. 2 about base 48 and third axis 55 of apparatus 44.

Figure 5:
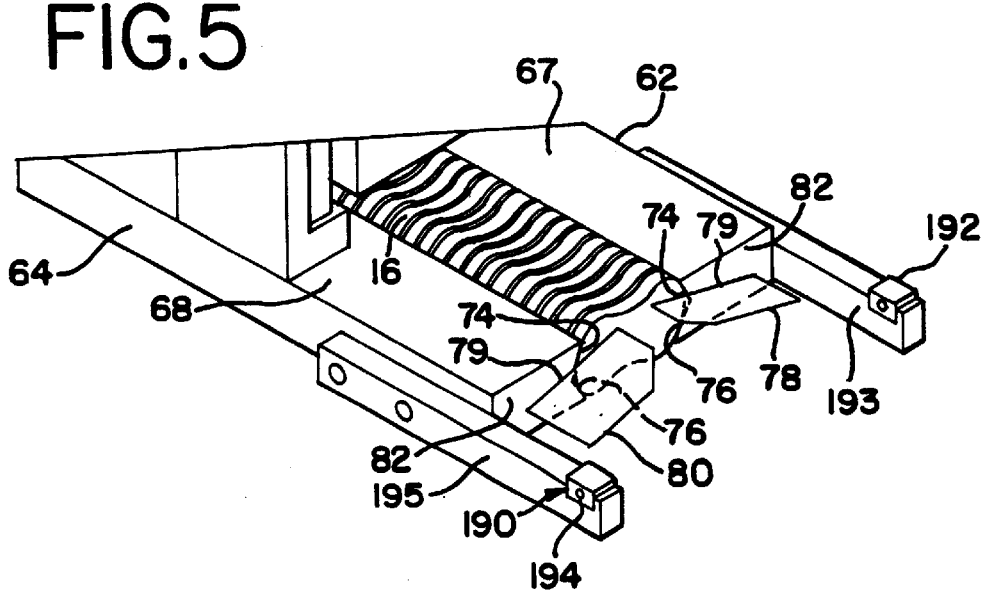
FIG. 5 is an oblique view of the back side of the gripper jaw assembly of FIG. 4, which includes the parts wipers.

Gripper jaw assembly 60 in FIGS. 4, 5 and 7 has first longitudinal jaw 62 and second longitudinal jaw 64, which jaws 62 and 64 are generally parallel to longitudinal axis 66 in FIG. 4. First jaw 62 has upper surface 67 with inner jaw surface 70, and second jaw 64 has upper surface 68 with inner jaw surface 72, which inner jaw surfaces 70 and 72 are preferably shaped as inverted chevrons with upper sloped surface 74 and lower sloped surface 76. The benefits, function and interrelationship of chevron-shaped inner jaw surfaces 70 and 72 along with wiper blades 78 and 80 mounted at the back side 82 of jaws 62 and 64, respectively, will be noted below.

First-gripper tool-block 84 and second-gripper tool-block 86 are, respectively, mounted on upper surfaces 67 and 68 of jaws 62 and 64. First and second tool blocks 84 and 86 vertically extend from upper surfaces 67 and 68 with gap 88 therebetween. Robotic slide mechanism 90 is positioned in gap 88 and coupled to tool blocks 84 and 86. Robotic slide reciprocating bars 94 protruding from slide mechanism sidewalls 96 and 98 are, respectively, connected to tool blocks 84 and 86 to move first and second jaws 62 and 64 between an open, or link-plate-disengaged, position and a closed, or link-plate-engaged, position. The linkplate-engaged position is shown in FIGS. 4, 5 and 7, wherein gripper jaw assembly 60 has grasped a plurality of link-plates 16. Flexible arm 46 with jaw assembly 60 affixed to distal end 52 is extendible to transfer link-plates 16 from a first operation, such as first press 18, to a second operation, such as second press 20 or 22, which particular press functions or operations are exemplary and not a limitation.

As noted above, gripper-jaw assembly 60 and flexible arm 46 transfer parts, and more specifically roller-chain link-plates 16, between operations. However, such parts transfer requires the following: alignment and accessibility of link-plates 16 at press 18; adequate positioning of jaw assembly 60 to grasp link-plates 16; means to separate adjacent or abutting link-plates 16 without disrupting the feeding and communication of link-plates 16 at first press 18; apparatus to accept and feed link-plates 16 at second press 20; and, synchronization of parts transfer assembly 40 in cooperation with the several operations to provide continuous operations.

Figure 6:
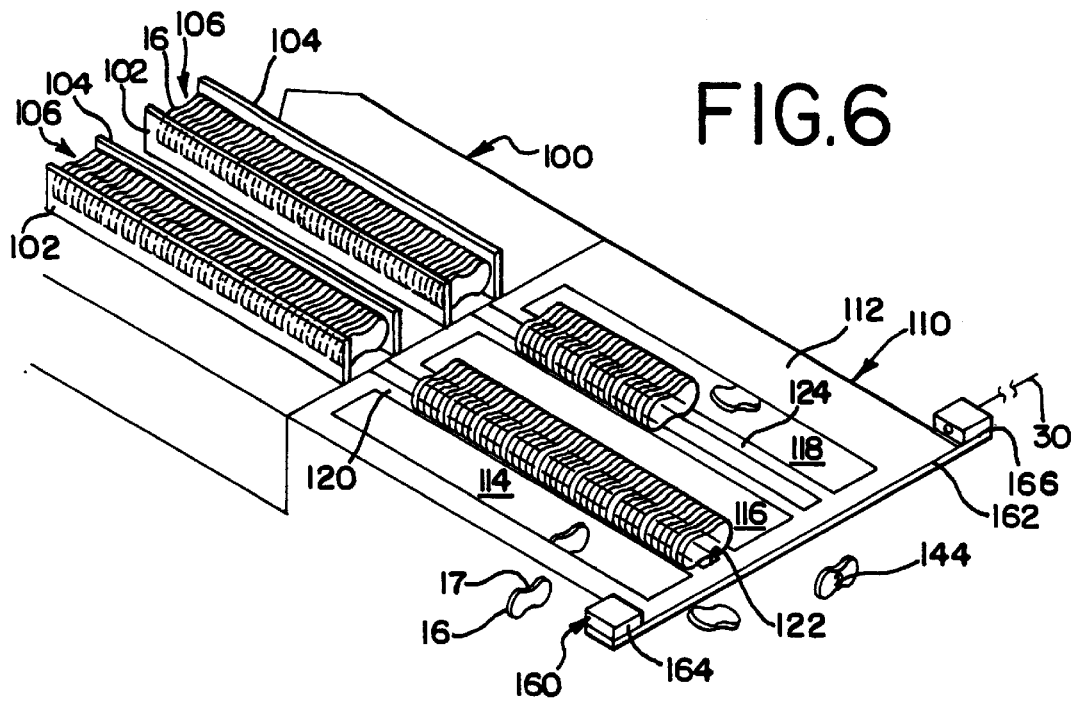
FIG. 6 is an oblique view of a parts escapement tray and blanking press exit tray.
Figure 6A:
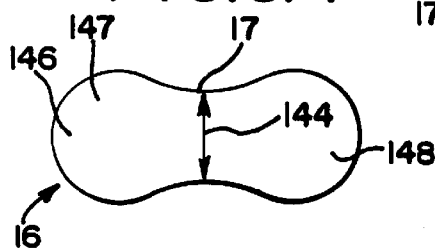
FIG. 6A is an elevational view of an on-edge, roller-chain link-plate.
Figure 6B:
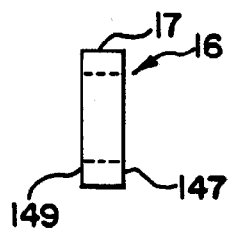
FIG. 6B is an end view of the on-edge, roller-chain link-plate of FIG. 6A.

In the present illustration, link-plates 16 are initially stamped or blanked at press 18 at a very high rate. Press 18 is a continuous and automatic operation providing a continuous flow of blanked, roller-chain, link-plates 16 at the press discharge end, which link-plates 16 advance from the press discharge end on link edge 17 in a vertical, on-edge progression shown in FIG. 6. Two blanking dies may be run in tandem to produce two rows of link-plates 16 to increase production of link-plates 16, as noted in FIG. 6. Link-plate blanks 16 are continuously fed from press or presses 18, and tooling is required at the link-plate discharge end of press 18 to adequately position blanks 16 for automatic transfer apparatus. In FIG. 6, link-plates 16 are continuously fed or moved along exiting tray 100 from press 18 on link-plate edges 17. Link-plates 16 are maintained on exiting tray 100 in this on-edge, vertical arrangement as a result of the stacked relationship between adjacent link-plates 16 and by transfer track or slot 106 between vertically arranged sidewalls 102 and 104.

Link-plates 16 are advanced along exiting tray 100 to parts escapement tray 110 by the continuing discharge of link-plates 16 from press 18. Tray 110 has upper surface 112 with longitudinal and parallel cutouts 114, 116 and 118. Track 120 longitudinally extends between cutouts 114 and 116 with arcuate parts-guide rod 122 positioned on track 120 and contoured to match the pinched-waist contour 144 of link-plate edge 17. Second track 124 with second parts-guide rod 126 longitudinally extends between cutouts 116 and 118 and is parallel to first track 120 to receive blanks from second press 18 and second feeding slot 106. Each of first and second parts-guide rods 122 and 124 are aligned with a track 106 on tray 100 to receive the advancing rows of link-plates 16.

In FIG. 6, a plurality of closely stacked link-plates 16 on edge 17 are provided in two rows on escapement tray 110. In this position, each row, or a portion of each row, of link-plates 16 is adaptable to be grasped by gripper jaw assembly 60 for transfer to a feeder assembly, such as tube feeder apparatus 130 in FIG. 7. Tube feeder 130 is mounted on second press 20 for feeding link-plates 16 to a second press operation. Feeder 130 has mounting plate 132 with parts passage 134, which mounting plate 132 may be secured to press 20 or 22, as noted in FIG. 1. First tube 136 and second tube 138 of feeder 130 are machined to conform to the pinched-waist radius of link-plates 16. First tube 136 and second tube 138 are secured to top surface 140 of mounting plate 132 on opposite sides of parts passage 134. Tubes 136 and 138 upwardly extend from surface 140 at acute angle, which angular displacement provides adequate space for the manipulation of gripper assembly 60 to transfer link-plates 16 to feeder 130. Gap 142 between first tube 136 and second tube 138 has a gap width approximately the width of link-plate pinch waist 144 noted in FIG. 6A.

As shown in FIG. 7, a group or sleeve of link-plates 16 are captured in gripper jaw assembly 60 and transferred to tube feeder 130 by directly positioning the sleeve of link-plates 16 between first tube 136 and second tube 138. The cross-sectional diameter of tubes 136, 138 is smaller than the separation distance or clearance 148, which is noted in FIG. 4, between robotic slide mechanism 90 and link-plates 16 secured between jaws 62 and 64. Thus, gripper assembly 60 can affirmatively transfer a full complement of link-plates 16 into tube-feeder gap 142.

As noted above, gripper assembly 60, and more specifically jaws 62 and 64 in cooperation with wiper blades 78 and 80, can grasp a sleeve or plurality of link-plates 16 at escapement tray 110. Thereafter, gripper assembly 60, in cooperation with robotic apparatus 44, can transfer the sleeve of link-plates 16 to tube-feeder slot 142. This grasping and transfer of link-plates 16 is repeatable without manual intervention after programming of controller 180 and CPU 14. However, grasping a sleeve of link-plates 16 requires positional information relative to the end of the row of link-plates 16 on each of part-guide rods 122 and 124.

Stamping or pressing operations generally utilize lubricants, which adhere to the parts produced by these operations. The surface tension of the oil on and between adjacent link-plates 16 in the present example, as well as the bur overlapping adjacent link-plates 16 in at least one of the forward or reverse directions of link-plate movement along escapement tray 110, inhibits easy separation of adjacent link-plates 16. This adherence can create disruption of an entire row of link-plates 16 on either of part-guide rods 122 and 124. Therefore, it is requisite that gripper assembly 60 provides sensing means to position jaws 62 and 64 for grasping a sleeve of link-plates 16. Also, the grasped group of link-plates 16 must be positively disengaged from remaining link-plates 16 on tray 110 without disturbing the smooth flow and movement of link-plates 16 along tray 110. Accommodation of this requisite attribute for gripper assembly 60 is provided by chevron-shaped inner jaw surfaces 70 and 72 in cooperation with wiper blades 78 and 80, and controller 180.

More specifically, controller 180 positions gripper jaw assembly 60 about one-sixteenth ($1/16$) inch to one-eighth ($1/8$) inch above surface 112 of escapement tray 110 and over one of the rows of link-plates 16 on rods 122 or 124. Rear sensor assembly 190 has sensor 192 on bar 193 and sensor 194 on bar 195, which bars 193 and 195 are, respectively, secured to jaws 62 and 64, to note the existence of link-plates 16 in proximity to gripper assembly 60.

Forward sensor assembly 170 at forward end 67 of gripper assembly 60 has first sensor 172 and second sensor 174 mounted on first jaw 62 and second jaw 64, respectively, to note or locate the leading link-plate 16, or link-plate position, on escapement tray 110, which provides a full sleeve of link-plates 16 to gripper assembly 60. As noted above, open jaws 62 and 64 are initially positioned slightly above upper surface 112 of tray 110 on either side of a link-plate parts stack on tray 110. This position allows closure of jaws 62 and 64 to grasp the edges of a stack of link-plate lobes 146 and 148 within the length of jaws 62 and 64. Gripper assembly 60 can then grasp and lift link-plates 16 from tray 110 into jaws 62, 64. Simultaneously, wiper blades 78 and 80 affirmatively separate the parts stack, or the last link-plate 16, at the rear of jaws 62 and 64 from the grasped link-plates 16 without disturbing the remaining link-plates 16 on tray 110. That is, the leading link-plates 16 at the rear of jaws 62 and 64 on tray 110 are maintained on tray 110 while allowing jaws 62 and 64 to grasp a plurality, or sleeve, of link-plates 16.

The preferred embodiment of wiper blades 78, 80 is provided by spring steel, however, alternative materials may be used including plastic, nylon, other elastomeric materials or alternative metallic materials. Parts separation is accommodated by contacting or grasping at least ten percent (10%) of the wall thickness of the last or most remote link-plate 16 anterior of jaw backside 82. A distance of ninety percent (90%) of the thickness of one link-plate 16 is maintained from jaw backside 82 to front 79 of wiper blades 78 and 80. The exact location or point of separation between adjacent link-plates 16 of the moving stack of link-plates 16 on tray 110 is a constant variable. As each row of link-plates 16 is continuously advancing, robotic arm 44 moves jaws 62 and 64 into position to grasp a plurality of link-plates 16 on tray 110. In this interactive situation, the last link-plate 300 in the plurality of link-plates 16 being grasped between jaws 62 and 64 is anticipated to be separated from the grasped stack of link-plates 16 by wipers 78 and 80 when jaws 62 and 64 capture less than ten percent (10%) of the link width or thickness.

The automated status of the present system requires control system 14 to control the several apparatus noted above, as well as providing synchronous operation of the several moving and operating components. Each of the several transfer and manufacturing components requires a sensing apparatus and a control apparatus or means of control. As shown schematically in FIG. 1, control signals and sensed signals are communicated over several lines between control system or CPU 14 and at least components 10, 18, 20 and 22. In FIG. 1, control signals are communicated between CPU 14 and blanking press 18, which control signals are in response to a positional signal communicated from sensor apparatus 160 at tray forward end 162 of parts escapement tray 110. Apparatus 160, for example, may be a photocell or laser sensor with a transmitter or sending unit 164 and a receiving unit 166. A link-plate 16 interrupting the signal between units 164 and 166 communicates a signal to CPU 14 over line 30, which signal indicates a full tray 110 and induces a control signal from CPU 14 to communicate a signal over line 24 to press 18 to disengage or pause. The specific apparatus controlling press 18 may be a FEMA valve, a solenoid valve or other transducer or switch apparatus known in the art, which may interrupt power or otherwise disengage operation of the press. The specific type of transducer element is not a part of the present invention.

Similarly, tube feeder 130 has sensor assembly 200 with transmitter 202 and receiver 204 respectively mounted on tubes 136 and 138. Sensors 202 and 204 are coupled to CPU 14 by line 36 to communicate a signal noting a low level of link-plates 16 in feeder slot 142. A low-level, link-plate signal sent to press 20 induces its disengagement or pause for receipt of a new supply of link-plates 16 in slot 142. CPU 14 receives the sensed signals and transmits control signals to presses 20 or 22 and also to flexible arm apparatus 10 to transfer parts to presses 20 or 22 in response to these signals.

Controller 180 of robotic arm apparatus 44 controls the motions, movement and location of flexible arm 46 and gripper jaw assembly 60. CPU 14 is internally or externally coupled to controller 180, which CPU 14 receives signals from sensor assemblies 160, 200, 190 and 170 respectively mounted on first press 18, tube feeder 12, and gripper assembly 60. In addition, motion and position signals from robotic apparatus 44 are received by and sent from CPU 14 and controller 180 over line 32. These signals provide position control of apparatus 44 and gripper assembly 60 for grasping link-plates 16 at first press 18 and transferring or releasing grasped link-plates 16 to second press 20, and more specifically to feeder apparatus 130.

In operation, parts transfer system 40 transfers link-plates 16 between manufacturing operations. CPU 14 senses signals from sensor assemblies 160, 170, 190 and 200, and analyzes the signals internally, such as by a comparator against empirical data or as open or closed circuits, or in other known analytical manners. In response to the sensed signals, CPU 14 communicates control signals to the several apparatus to control the actuation of the blanking operation on first press 18; the motion and movement of robotic apparatus 44 with flexible arm 46 and gripper assembly 60; tube feeder apparatus 130; and, second press 20 or 22. The several independent operations are thus synchronized to feed and maintain a steady stream of link-plates 16 to escapement tray 110; to rapidly grasp a plurality or sleeve of link-plates 16 from tray 110; to move flexible arm 46 and gripper assembly 60 with link-plates 16 to tube feeder 130 for feeding second operations 20 or 22; and, to simultaneously maintain the actuation of first operation 18 in cooperation with second operation 20 or 22. Utilization of transfer system 40 removes an operator from the space between high speed press operations, thus eliminating a potential safety hazard.

While the invention has been described in connection with certain specific embodiments thereof, it is to be understood that this is by way of illustration and not by way of limitation; and the scope of the appended claims should be construed as broadly as the prior art will permit.

We claim:

1. A gripper-jaw apparatus for grasping a plurality of roller-chain link-plates from a horizontal column of link-plates, said gripper-jaw apparatus comprising:

a first clamping jaw and a second clamping jaw, said first jaw having a first inner edge, a first outer edge, an upper surface, a lower surface, a forward end and a rearward end, said second jaw having a second inner edge, a second outer edge, an upper surface, a lower surface, a forward end and a rearward end, said first and second inner edges being aligned and parallel, said first inner edge having a first contour, and second inner edge having a second contour, said first and second contours being a mirror image of the other of said first and second contours;

a slide assembly mounted on said first and second upper surfaces and operable to move said first jaw and said second jaw between an open position and a closed position, a parts wiper assembly coupled to said first and second rearward ends, a control system, means for connecting, said connecting means coupling said slide assembly to said control system, said control system operable to actuate said slide assembly to move said first jaw and said second jaw between a first and closed position to grasp a plurality of link-plates, said wiper assembly operable to dislodge contacting link plates outside said closed first and second jaws and maintain alignment of ungrasped link-plates of said horizontal column.

2. A gripper-jaw apparatus as claimed in claim 1 wherein said wiper assembly has a first wiper and a second wiper;

means for securing;

one of said first and second wipers mounted on said rearward end of one of said first and second jaws by said securing means and extending toward the other of said first and second jaws, the other of said first and second wipers mounted on said rearward end of the other of said first and second jaws by said securing means and extending toward the other of said first and second jaws, said wipers contacting said link plates in said horizontal column anterior said first and second jaw rearward ends to disengage said link-plates in said first and said jaws from said link-plates of said horizontal column.

3. A gripper-jaw apparatus as claimed in claim 2 wherein said first and second wipers are one of a metal, a plastic, a nylon and other elastomeric materials.

4. A gripper-jaw apparatus as claimed in claim 3 wherein said metal is spring steel.

5. A gripper-jaw apparatus as claimed in claim 1 and further comprising means for securing;

said slide assembly having a first mounting block secured to one of said first and second upper surfaces by said securing means, a second mounting block secured to the other of said first and second upper surfaces, a robotic slide mounted between said first and second mounting blocks, said robotic slide having means for actuating and second means for connecting, said second connecting means extending from said actuating means and coupled to said first mounting block and said second mounting block, said control system coupled to said actuating means, said second connecting means extensible between and open position and a closed position by said actuating means to move said first and second mounting blocks and gripper jaws between an open position and a closed position.

6. A gripper-jaw apparatus as claimed in claim 5 wherein said actuating means is one of hydraulic, pneumatic and electrical apparatus coupled to said second connecting means.

7. A gripper-jaw apparatus as claimed in claim 1 wherein said first and second jaw contours at said inner edges are concave and chevron-shaped.

* * * * *